(12) United States Patent
Chang

(10) Patent No.: US 10,035,557 B2
(45) Date of Patent: Jul. 31, 2018

(54) SELF-BALANCING VEHICLE FRAME

(71) Applicant: Fu-Long Chang, Chiayi (TW)

(72) Inventor: Fu-Long Chang, Chiayi (TW)

( * ) Notice: Subject to any disclaimer, the term of this patent is extended or adjusted under 35 U.S.C. 154(b) by 104 days.

(21) Appl. No.: 14/977,117

(22) Filed: Dec. 21, 2015

(65) Prior Publication Data

US 2016/0101823 A1    Apr. 14, 2016

Related U.S. Application Data

(63) Continuation-in-part of application No. 14/542,134, filed on Nov. 14, 2014, now Pat. No. 9,499,228.

(30) Foreign Application Priority Data

Jun. 10, 2014    (CN) .......................... 2014 1 0260138

(51) Int. Cl.
| | | |
|---|---|---|
| B62K 3/00 | (2006.01) | |
| B62K 21/12 | (2006.01) | |
| B62K 5/01 | (2013.01) | |
| B62K 11/00 | (2006.01) | |

(52) U.S. Cl.
CPC ................ *B62K 3/007* (2013.01); *B62K 5/01* (2013.01); *B62K 11/007* (2016.11)

(58) Field of Classification Search
CPC ....... B62K 3/007; B62K 3/002; B62K 11/007
See application file for complete search history.

(56) References Cited

U.S. PATENT DOCUMENTS

| | | | | |
|---|---|---|---|---|
| 7,957,961 B2* | 6/2011 | Zhan | ..................... | G10L 19/005 704/207 |
| 8,028,777 B2* | 10/2011 | Kakinuma | ............. | A63C 17/08 180/218 |
| 9,403,573 B1* | 8/2016 | Mazzei | .................. | B62D 51/02 |
| 9,751,581 B2* | 9/2017 | Yang | ...................... | B62K 21/16 |
| 2007/0131461 A1* | 6/2007 | Treadwell | ............... | B62B 5/005 180/19.1 |
| 2010/0025139 A1* | 2/2010 | Kosaka | ................... | B62D 61/00 180/218 |
| 2012/0166048 A1* | 6/2012 | Inoue | ................... | G05D 1/0061 701/49 |
| 2013/0238231 A1* | 9/2013 | Chen | ..................... | B62K 3/007 701/124 |
| 2016/0129963 A1* | 5/2016 | Ying | .................... | B62D 51/001 180/6.5 |

\* cited by examiner

*Primary Examiner* — Tony H Winner
(74) *Attorney, Agent, or Firm* — Muncy, Geissler, Olds & Lowe, P.C.

(57) ABSTRACT

A self-balancing vehicle frame is mounted with two angle sensors and two wheels that are electrically and respectively coupled to the angle sensors, and includes a front frame assembly that includes two front frame units and a first connecting unit. The front frame units cooperatively define a connecting space therebetween. Each of the front frame units is mounted with a respective one of the wheels and a respective one of the angle sensors, and is operable to tilt the corresponding one of the angle sensors. The first connecting unit is located in the connecting space, and interconnects the front frame units such that the front frame units are rotatable relative to each other.

15 Claims, 20 Drawing Sheets

SELF-BALANCING VEHICLE FRAME

CROSS-REFERENCE TO RELATED APPLICATION

This application is a continuation-in-part (CIP) of U.S. Pat. No. 9,499,228 B2, filed on Nov. 14, 2014, which claims priority of Chinese Application No. 201410260138.5, filed on Jun. 10, 2014.

FIELD

The disclosure relates to a vehicle frame, and more particularly to a self-balancing vehicle frame.

BACKGROUND

Currently, a single-wheeled or two-wheeled self-balancing vehicle is a popular vehicle, and includes a built-in self-balancing electric system that uses a gyro, angle sensors, or a similar device to detect forward or rearward tilt of the vehicle to thereby drive automatically rotation of the wheels to compensate tilt of the vehicle, in such a manner that the vehicle is maintained in a balanced state. During use of a single-wheeled self-balancing vehicle, since there is only one touchdown point, the balance along the direction of the axle must be controlled by adjusting the pose through the user. As a result, the single-wheeled self-balancing vehicle is difficult to balance and control. Although a two-wheel self-balancing vehicle can overcome the shortcomings said above, it includes one standing platform and a middle handle that is set to move or turn the vehicle, so that the user must use the hands and feet to operate the vehicle simultaneously.

Moreover, during turning of the two-wheeled self-balancing vehicle, since the body of the user is thrown outwardly by virtue of centrifugal force, in order to keep standing stable, an excessive pulling force is bound to be applied by the user to the middle handle. Hence, unexpected excessive turning magnitude results in overturning of the vehicle. As such, to ensure safety during turning of the vehicle, it is necessary to carefully hold and control the middle handle. Furthermore, due to obstruction of the middle handle, it is difficult for the user to jump away through the front of the vehicle, thereby resulting in potential danger during use.

SUMMARY

Therefore, an object of the disclosure is to provide a self-balancing vehicle frame that can overcome at least one of the aforesaid drawbacks associated with the prior arts.

According to an aspect of the disclosure, the self-balancing vehicle frame is mounted with two angle sensors and two wheels that are electrically and respectively coupled to the angle sensors. Each of the wheels is controlled to rotate for maintaining a corresponding one of the angle sensors in a balanced state in response to tilt of the corresponding one of the angle sensors. The self-balancing vehicle frame includes a front frame assembly that includes two front frame units and a first connecting unit. The front frame units cooperatively define a connecting space therebetween. Each of the front frame units is mounted with a respective one of the wheels and a respective one of the angle sensors, and is operable to tilt the corresponding one of the angle sensors. The first connecting unit is located in the connecting space, and interconnects the front frame units such that the front frame units are rotatable relative to each other.

According to another aspect of the disclosure, the self-balancing vehicle frame is mounted with two angle sensors and two wheels that are electrically and respectively coupled to the angle sensors. Each of the wheels is controlled to rotate for maintaining a corresponding one of the angle sensors at a balanced state in response to tilt of the corresponding one of the angle sensors. The self-balancing vehicle frame includes a front frame assembly that includes two front frame units, an intermediate frame and two first connecting units. The front frame units cooperatively define a connecting space therebetween. Each of the front frame units is mounted with a respective one of the wheels and a respective one of the angle sensors, and is operable to tilt the corresponding one of the angle sensors. The intermediate frame is disposed between the front frame units, and has a main body, and two connecting walls that extend respectively and upwardly from two opposite lateral edges of the main body. Each of the first connecting units interconnects a respective one of the front frame units and a respective one of the connecting walls of the intermediate frame such that the front frame units are rotatable relative to the intermediate frame independently of each other.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
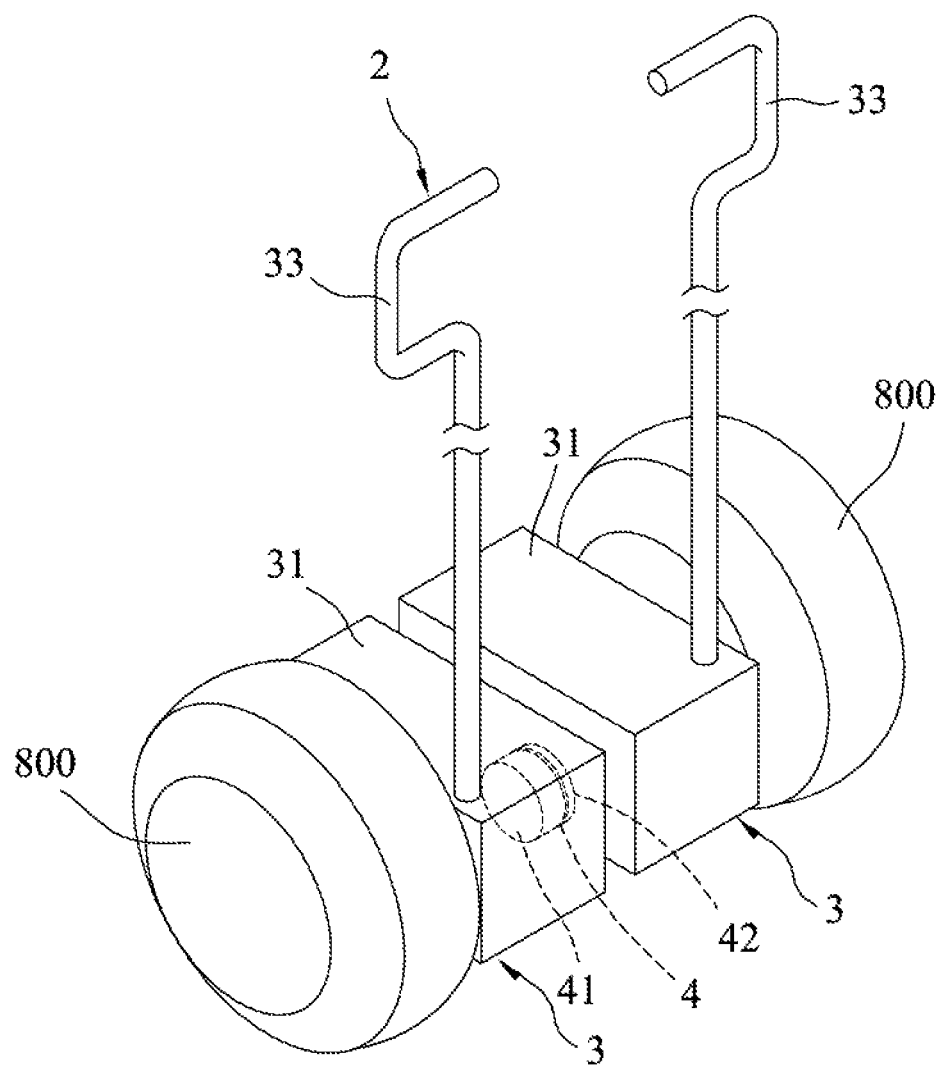
FIG. 1 is a perspective view of a first embodiment of a self-balancing vehicle frame according to the disclosure.

Before the disclosure is described in greater detail, it should be noted that like elements are denoted by the same reference numerals throughout the disclosure.

Figure 2:
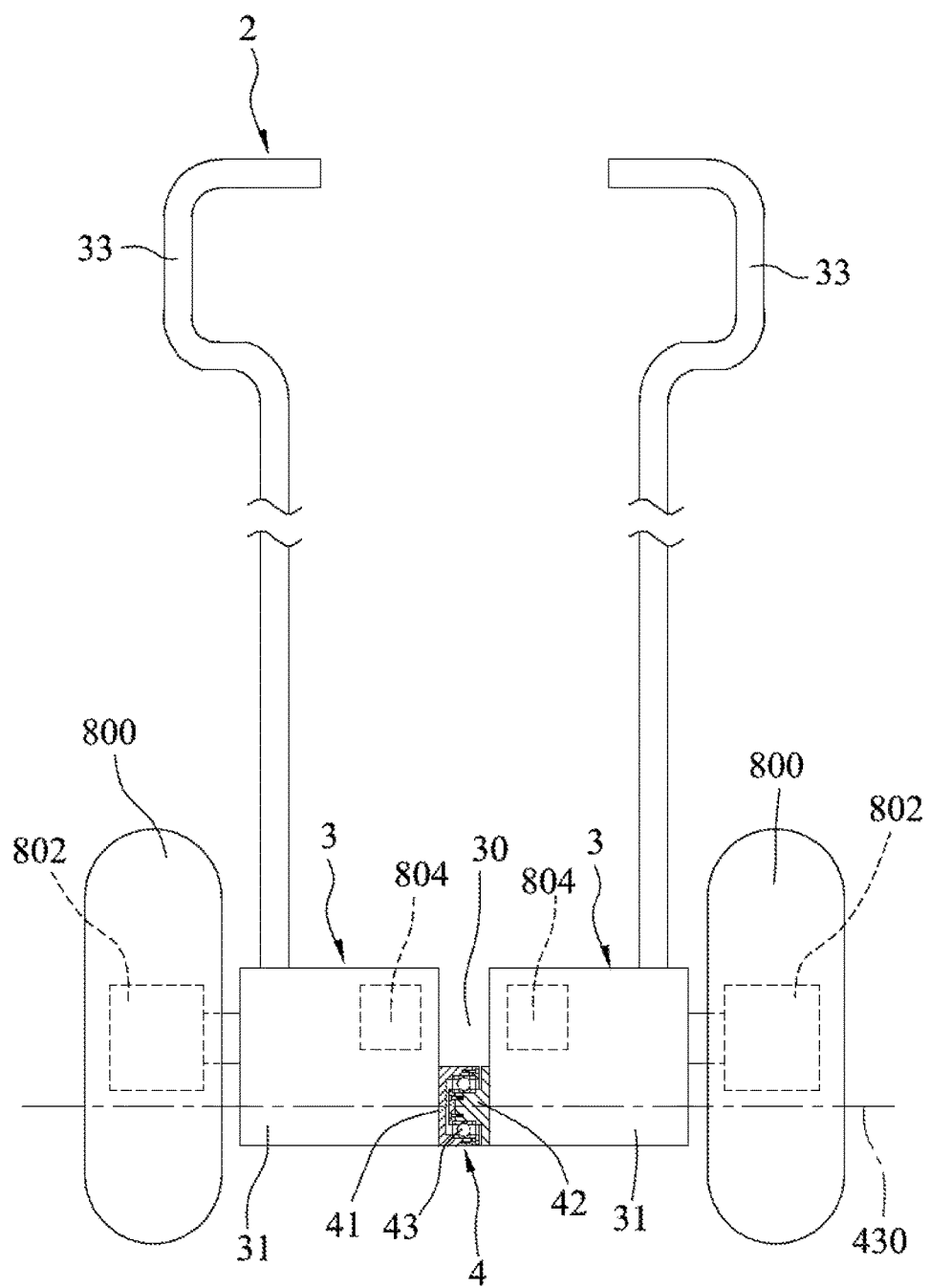
FIG. 2 is a schematic front view of the first embodiment.
Figure 3:
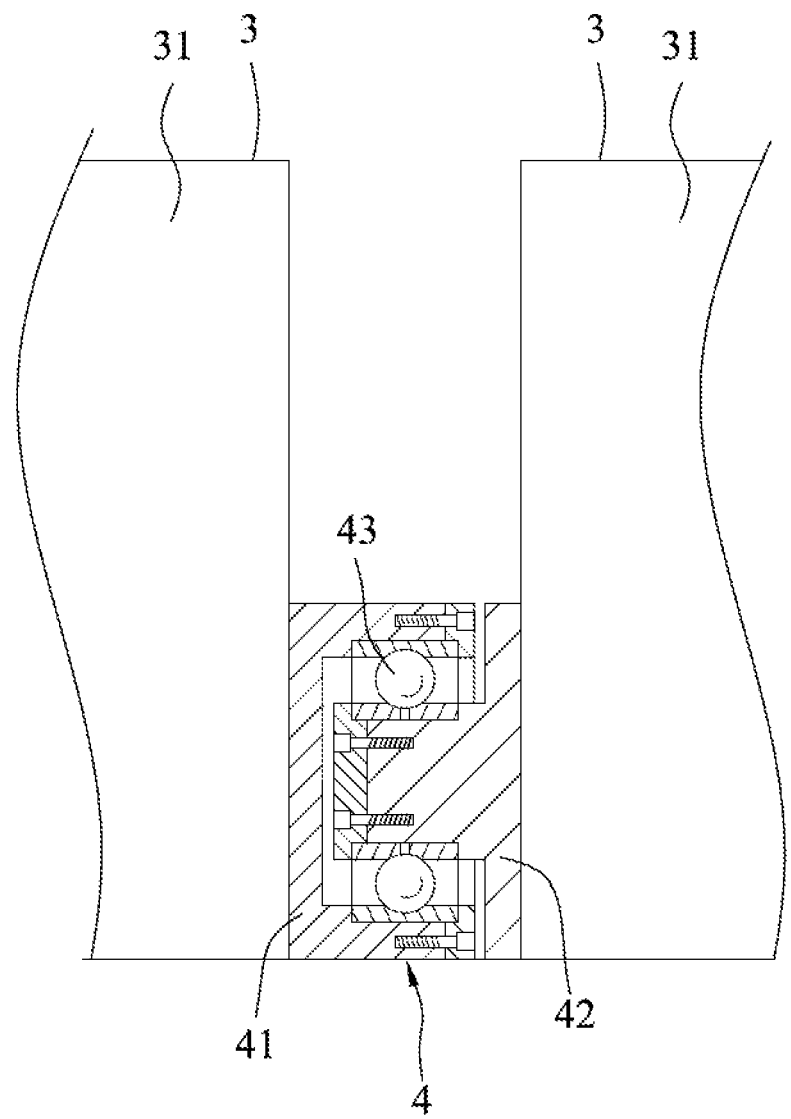
FIG. 3 is a fragmentary partly sectional view of the first embodiment.

Referring to FIGS. 1, 2, and 3, a vehicle is shown to include a first embodiment of a self-balancing vehicle frame according to this disclosure, two angle sensors 804, and two wheels 800 that are electrically and respectively coupled to the angle sensors 804. Each of the wheels 800 has a built-in driving component (not shown) that is electrically coupled to a corresponding one of the angle sensors 804. Each of the angle sensors 804 includes a gyro (not shown) and/or an angle detector (not shown) for measuring angular displacement. When one angle sensor 804 is tilted forwardly or rearwardly, the corresponding wheel 800 is controlled to rotate in a corresponding direction, so as to maintain the angle sensor 804 in a balanced state, and therefore to maintain the self-balancing vehicle frame in a balanced state. The operation of the angle sensors 804 and the wheels 800 is a known art, and will not be illustrated in the following paragraphs.

The first embodiment of this disclosure includes a front frame assembly 2 that includes two front frame units 3, and a first connecting unit 4 connected between the front frame units 3 such that the front frame units 3 are rotatable relative to each other about a first axis 430 of the first connecting unit 4.

Each of the front frame units 3 includes a pedal 31 that is configured as a hollow box, and a handle 33 that extends upwardly from a top end of the pedal 31. Each of the angle sensors 804 is mounted in the pedal 31 of a respective one of the front frame units 3. Each of the wheels 800 is mounted to one side of the pedal 31 of a respective one of the front frame units 3 that is distal from the other one of the front frame units 3, and is rotatable relative to the respective one of the front frame units 3 about a rotating axis parallel to the first axis 430. The first axis 430 is located below centers of the wheels 800. The pedals 31 of the front frame units 3 cooperatively define a connecting space 30 therebetween.

The first connecting unit 4 is located in the connecting space 30, and includes a first connecting seat 41 that is connected fixedly to an inner side surface of the pedal 31 of one of the front frame units 3 facing the other one of the front frame units 3, a second connecting seat 42 that is connected fixedly to an inner side surface of the pedal 31 of the other one of the front frame units 3 facing the one of the front frame units 3, and a seat connecting bearing 43 that is mounted between the first and second connecting seats 41, 42 such that the pedals 31 of the front frame units 3 are rotatable relative to each other about the first axis 430.

During use, a user steps on the pedals 31 using the feet and holds the handles 33 using the hands for tilting the angle sensors 804 so as to control the wheels 800.

Figure 4:
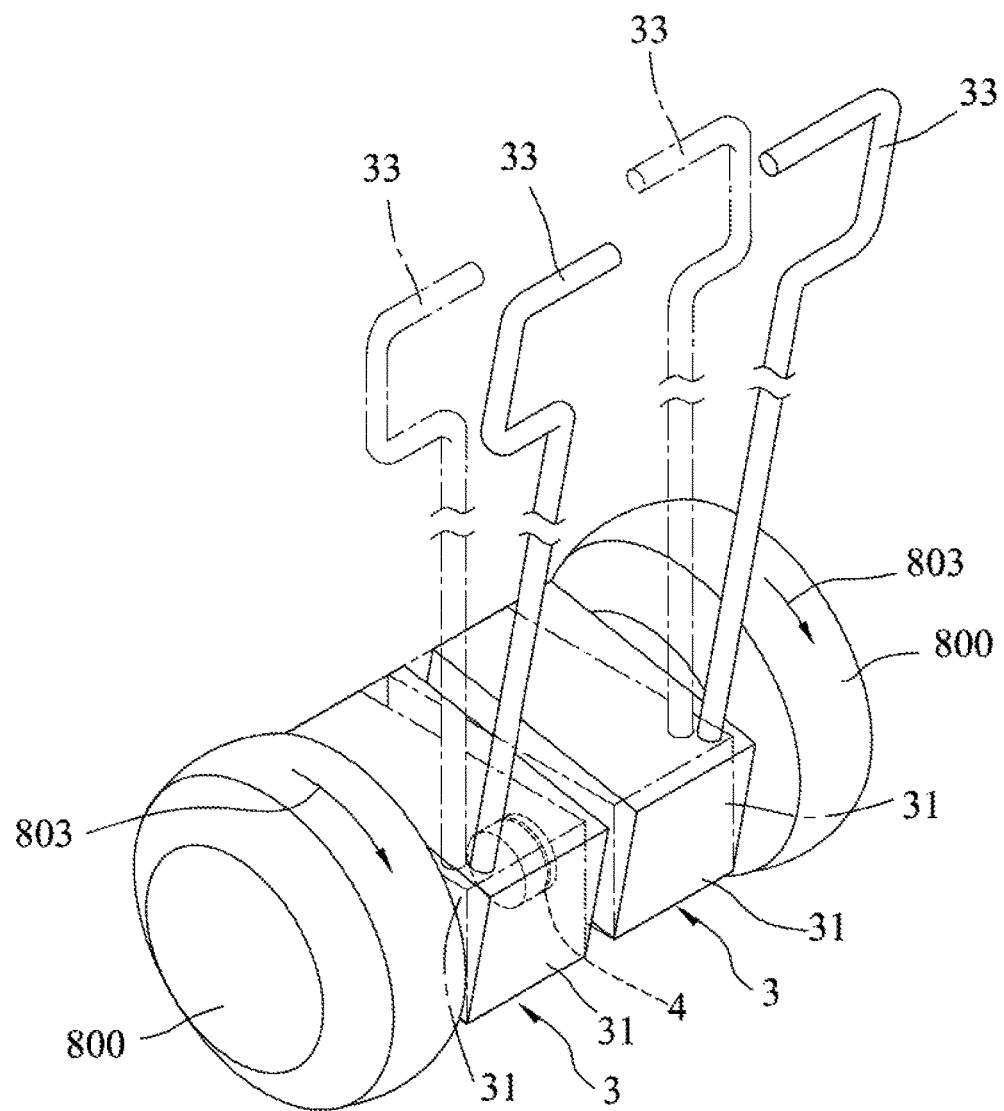
FIG. 4 is a view similar to FIG. 1 but illustrating forward tilt of two front frame units of the first embodiment.

With particular reference to FIGS. 2 and 4, the vehicle can be moved forwardly by pushing the handles 33 forwardly with the hands and/or tilting the pedals 31 forwardly with the feet. When the handles 33 are pushed forwardly, or when the pedals 31 are tilted forwardly, the angle sensors 804 are also tilted forwardly to drive synchronous rotation of the wheels 800 in a positive direction 803, thereby moving the vehicle forwardly and maintaining the vehicle in a balanced state.

Figure 5:
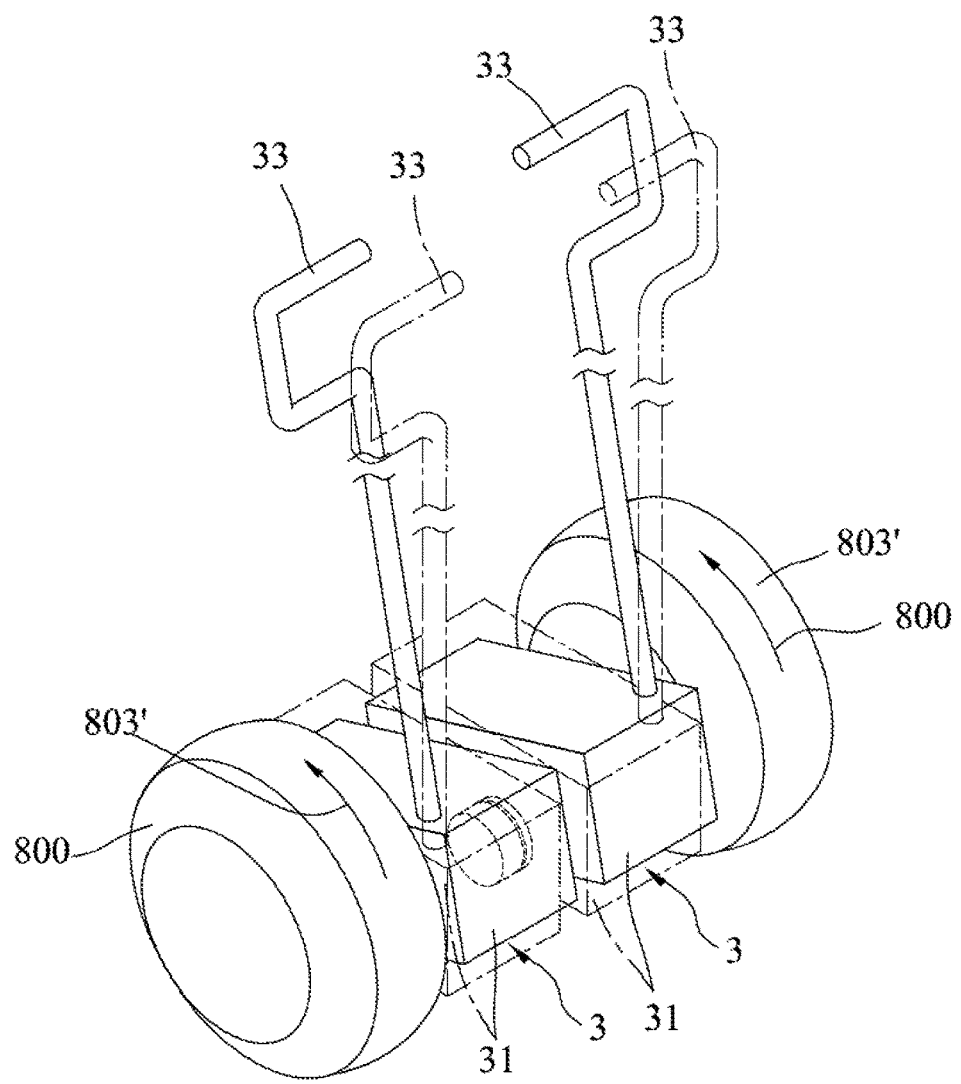
FIG. 5 is a view similar to FIG. 1 but illustrating rearward tilt of the two front frame units.

With particular reference to FIGS. 2 and 5, the vehicle can be moved rearwardly by pulling the handles 33 rearwardly with the hands and/or tilting the pedals 31 rearwardly with the feet. When the handles 33 are pushed rearwardly, or when the pedals 31 are tilted rearwardly, the angle sensors 804 are also tilted rearwardly to drive synchronous rotation of the wheels 800 in a reverse direction 803' opposite to the positive direction 803 (see FIG. 4), thereby moving the vehicle rearwardly and maintaining the vehicle in a balanced state.

To stop the vehicle, the user needs to keep his own balance until the handles 33 and the angle sensors 804 are rotated back to the initial positions, so as to allow the angle sensors 804 to stop the wheels 800.

Figure 6:
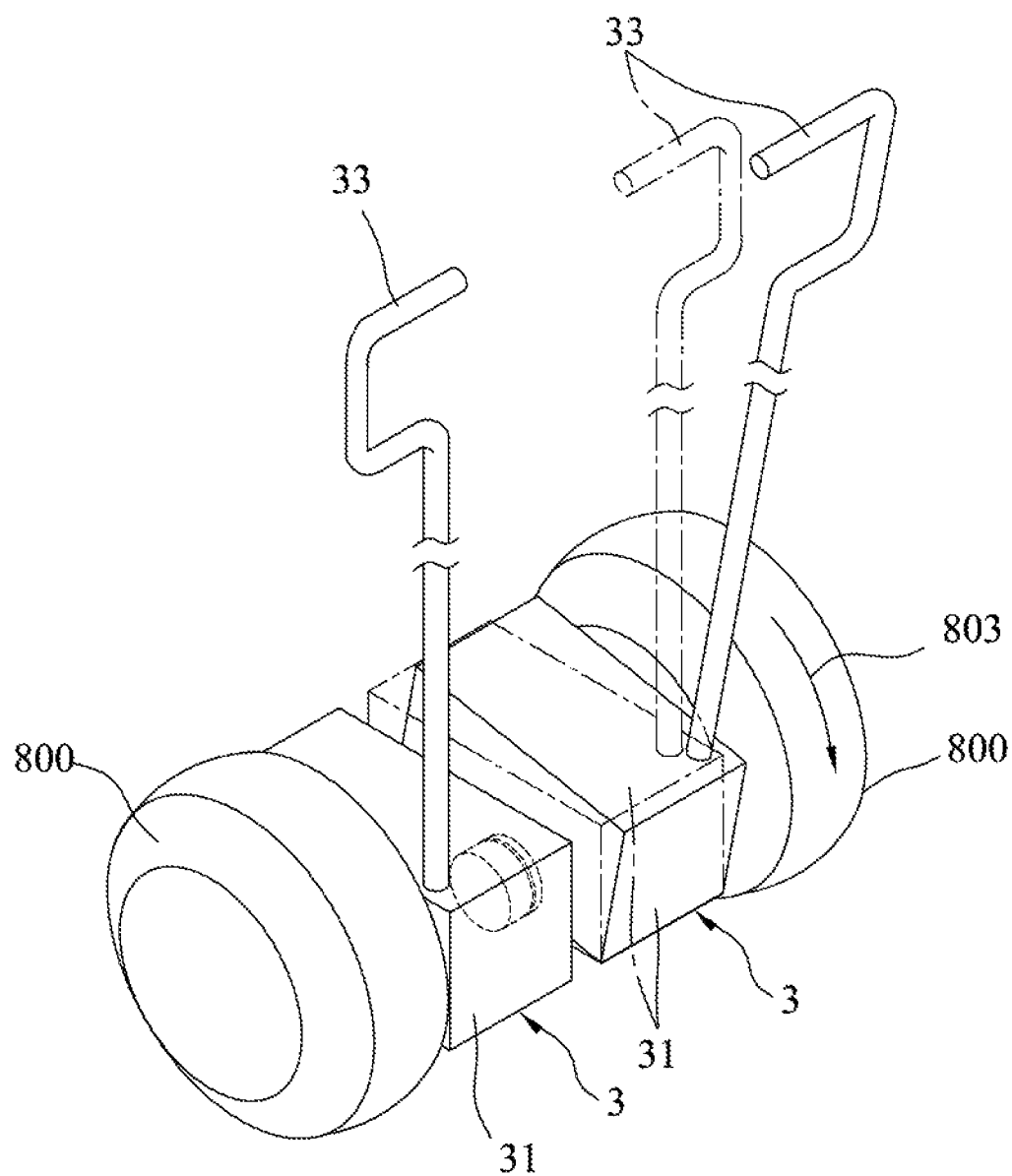
FIG. 6 is a view similar to FIG. 1 but illustrating forward tilt of the left front frame unit.
Figure 7:
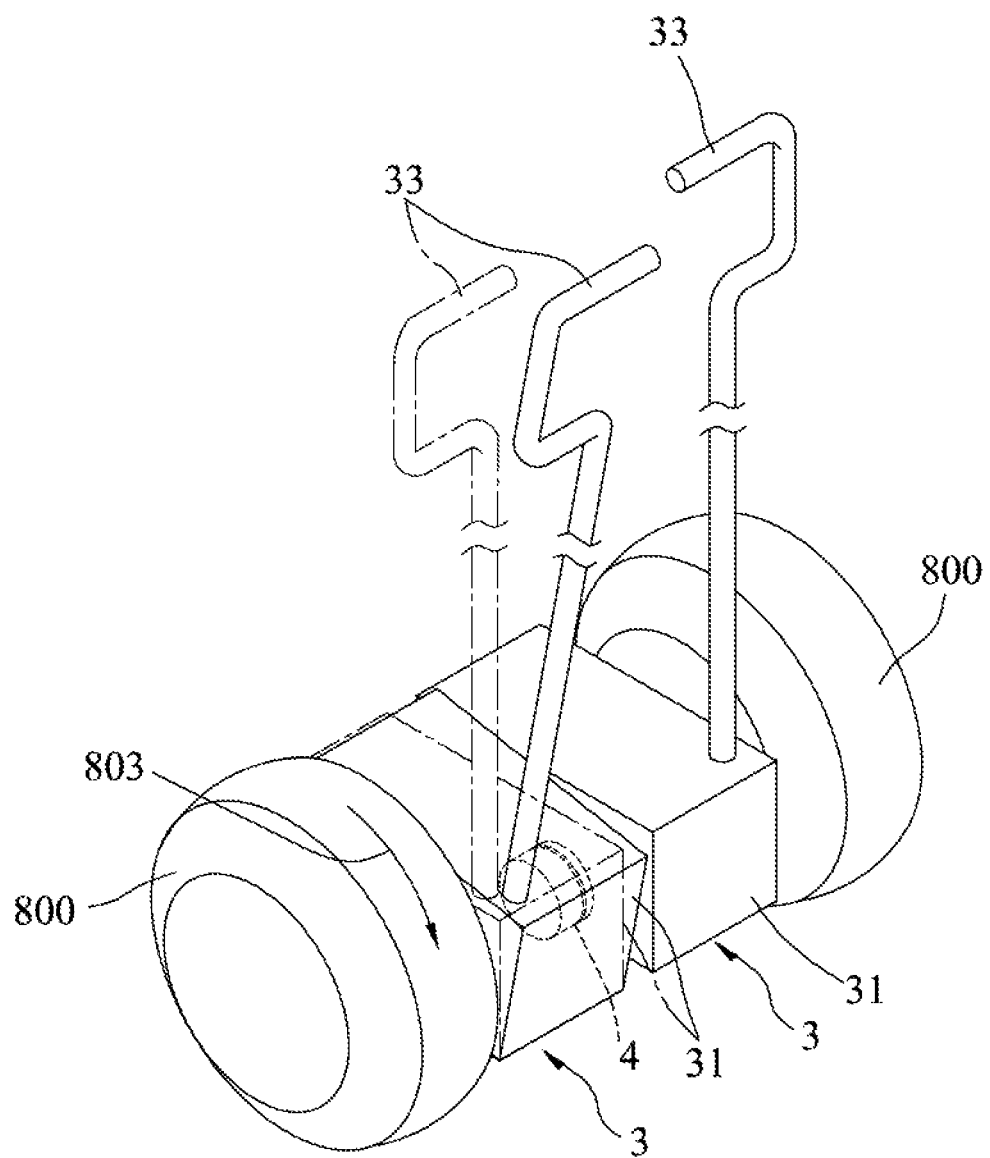
FIG. 7 is a view similar to FIG. 1 but illustrating forward tilt of the right front frame unit.

With particular reference to FIGS. 2, 6, and 7, when it is desired to move the vehicle forwardly and turn the vehicle rightwardly, it is only necessary to apply a force to the left handle 33 or the left pedal 31 to tilt the left handle 33 and the left pedal 31 forwardly. Hence, the left angle sensor 804 is tilted forwardly to control the left wheel 800 to rotate in the positive direction 702. Similarly, when it is desired to move the vehicle forwardly and turn the vehicle leftwardly, it is only necessary to apply a force to the right handle 33 or the right pedal 31 to tilt the right handle 33 and the right pedal 31 forwardly. Hence, the right angle sensor 804 is tilted forwardly to control the right wheel 800 to rotate in the positive direction 702. Conversely, when it is desired to move the vehicle rearwardly and turn the vehicle rightwardly, it is only necessary to apply a force to tilt the left front frame unit 3 rearwardly. Hence, the left angle sensor 804 is tilted rearwardly to control the left wheel 800 to rotate in the reverse direction 803'. Similarly, when it is desired to move the vehicle rearwardly and turn the vehicle leftwardly, it is only necessary to apply a force to tilt the right front frame unit 3 rearwardly. Hence, the right angle sensor 804 is tilted rearwardly to control the right wheel 800 to rotate in the reverse direction 803'. As such, the vehicle can be turned by operating one of the front frame units 3.

Alternatively, the vehicle may be turned by operating both of the front frame units 3. To be more specific, the vehicle can be turned by tilting one of the front frame units 3 forwardly and tilting the other of the front frame units 3 rearwardly.

Through operation of the pedals 31 and the handles 33, the angle sensors 804 can be tilted forwardly and rearwardly so that the vehicle can be controlled conveniently using the hands or feet of the user, thereby facilitating control of the vehicle. Furthermore, if the vehicle is out of control, the user can jump away from the vehicle through a space between the handles 33, so as to promote safety during use. Although the handles 33 are provided in this embodiment, they may be omitted so that the vehicle is controlled by operating only the pedals 31.

In this embodiment, the first and second connecting seats 41, 42 of the first connecting unit 4 are connected respectively and fixedly to the front frame units 3 for purposes of replacement. However, in actual practice, the first and second connecting seats 41, 42 may be formed respectively and integrally on the front frame units 3 for convenience of manufacture and assembly. The seat connecting bearing 43 may be replaced with any other suitable member as long as relative rotation of the first and second connecting seats 41, 42 is allowed. Or, the first connecting unit 4 may be replaced with any other suitable member as long as relative rotation of the pedals 31 is allowed.

Figure 8:
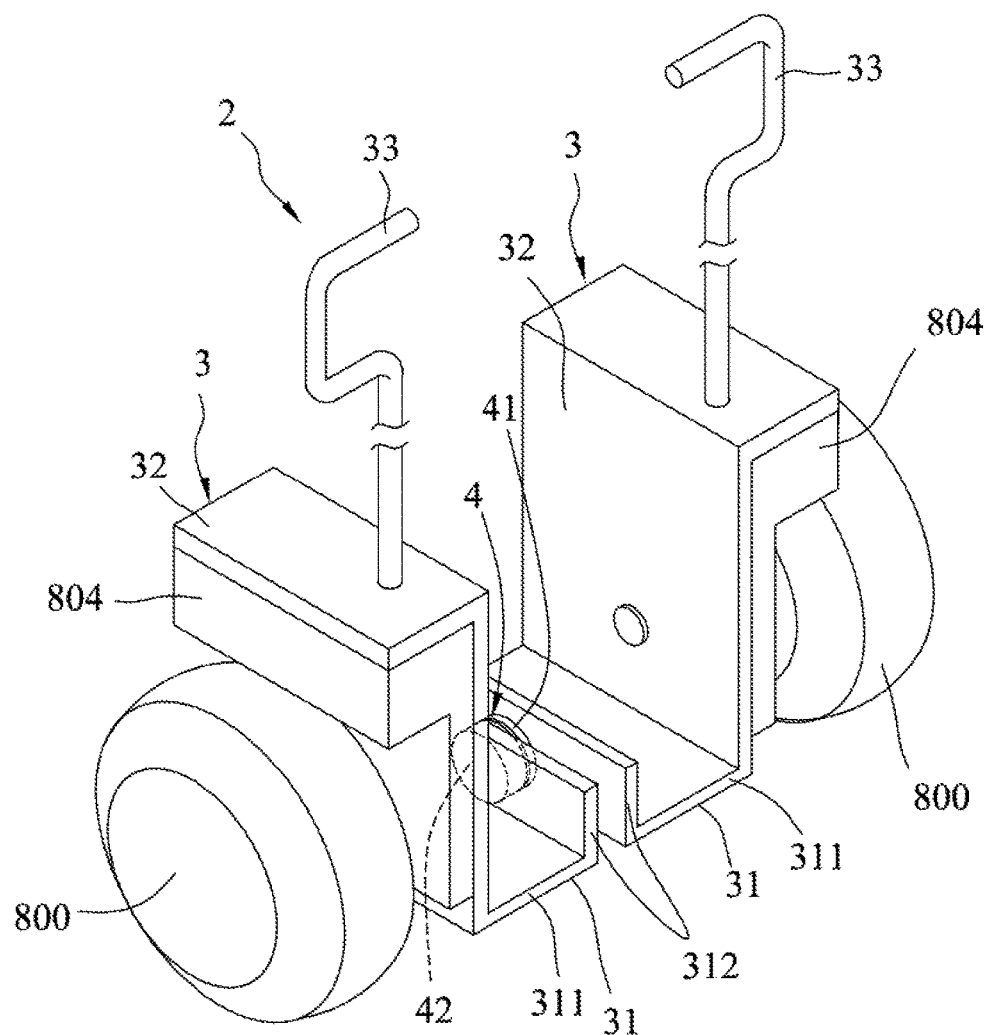
FIG. 8 is a perspective view of a second embodiment of the self-balancing vehicle frame according to the disclosure.
Figure 9:
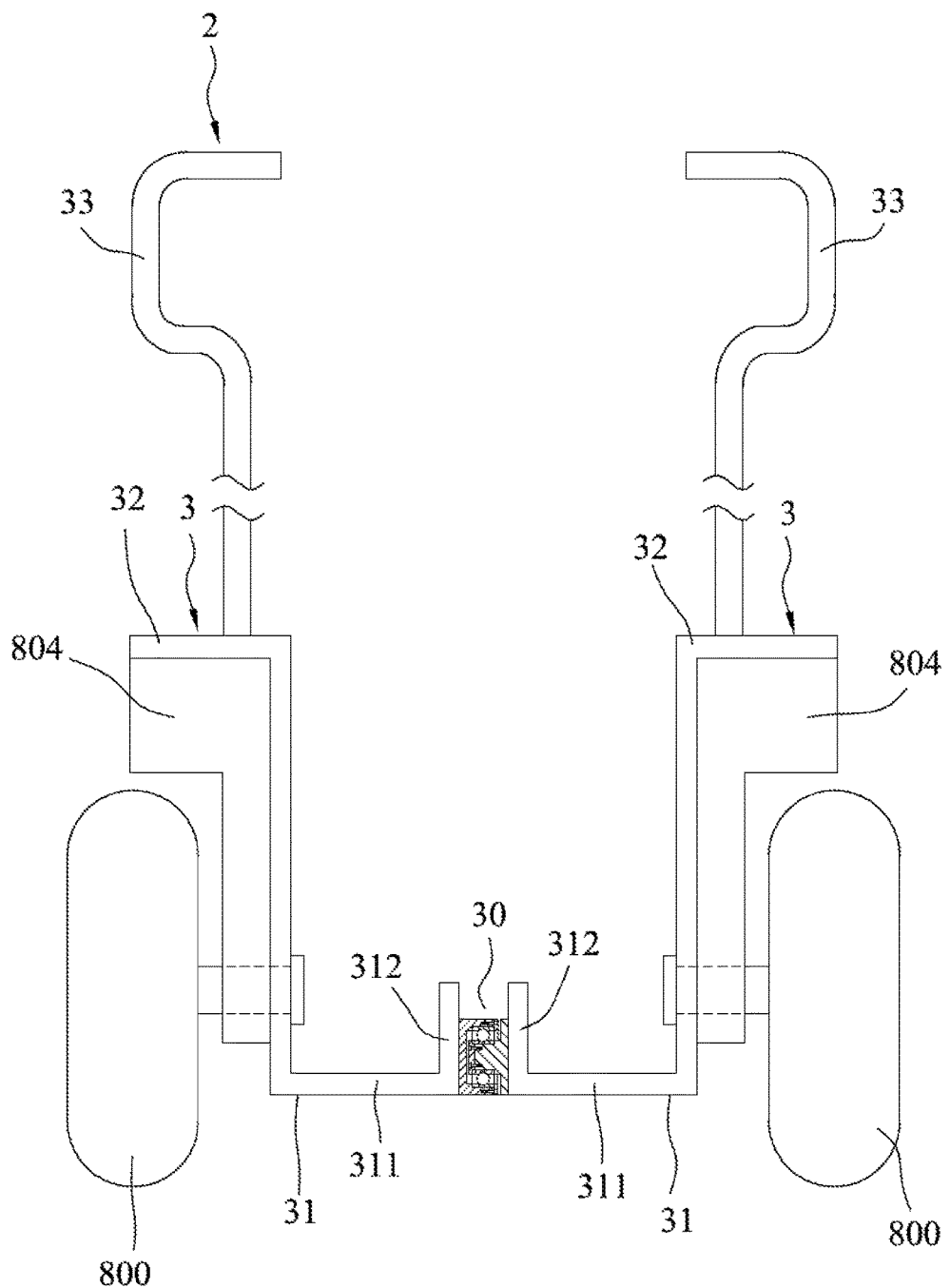
FIG. 9 is a schematic front view of the second embodiment.

Referring to FIGS. 8 and 9, a second embodiment of the self-balancing vehicle frame according to this disclosure includes a front frame assembly 2 that includes two front frame units 3, and a first connecting unit 4 connected between the front frame units 3.

Each of the front frame units 3 includes a frame body 32, a pedal 31 that is connected to a lower end portion of the frame body 32, and a handle 33 that is disposed on a top end of the frame body 32. The frame body 32 of each of the front frame units 3 is mounted with the respective one of the wheels 800 and the corresponding one of the angle sensors 804. The pedal 31 of each of the front frame units 3 has a pedal wall 311 that extends from the lower end portion of the corresponding frame body 32 toward the other one of the front frame units 3, and a blocking wall 312 that extends upwardly from an end of the pedal wall 311 distal from the corresponding frame body 32. The blocking walls 312 of the front frame units 3 cooperatively define the connecting space 30 therebetween. The first and second connecting seats 41, 42 are connected fixedly and respectively to the blocking walls 312 of the front frame units 3, and are interconnected pivotally by the seat connecting bearing 43, so as to permit the relative rotation between the front frame units 3.

Similar to the first embodiment, a user can step on the pedals 31 using the feet and hold the handles 33 using the hands for tilting the angle sensors 804 so as to control the movement of the vehicle.

Figure 10:
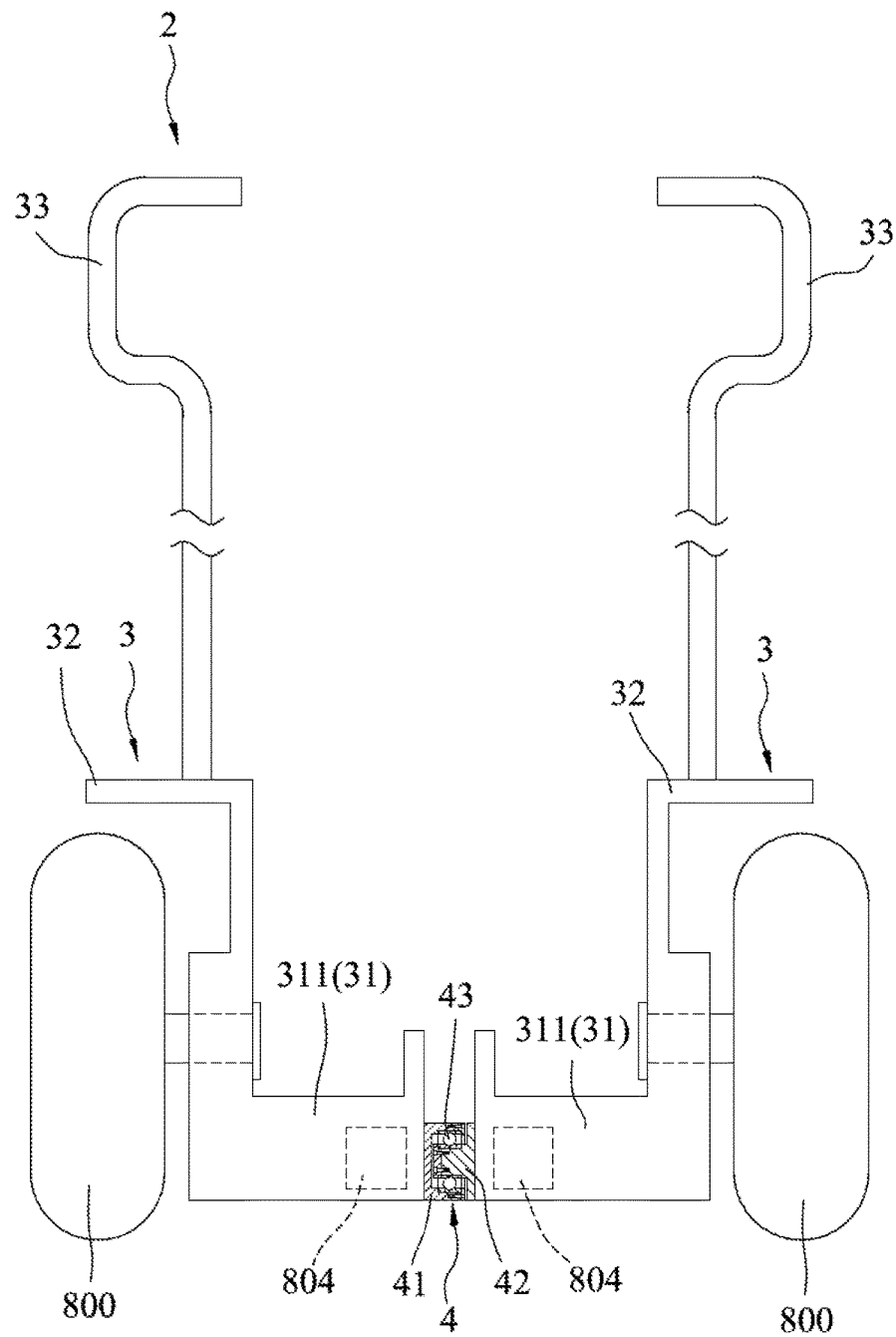
FIG. 10 is a schematic front view of a variation of the second embodiment.

Referring further to FIG. 10, in a variation of the second embodiment, the pedal wall 311 of each of the front frame units 3 is configured as a hollow box in which the corresponding angle sensor 804 is mounted. The first and second connecting seats 41, 42 are connected fixedly and respectively to lower portions of the pedal walls 311 of the front frame units 3, and are interconnected pivotally by the seat connecting bearing 43, so as to permit the relative rotation between the front frame units 3.

Moreover, each of the front frame units 3 of the self-balancing vehicle frame of this disclosure may be mounted with a single-wheeled self-balancing vehicle to form a two-wheeled self-balancing vehicle. A user can operate the front frame units 3 so as to control the movement of the two-wheeled self-balancing vehicle.

Figure 11:
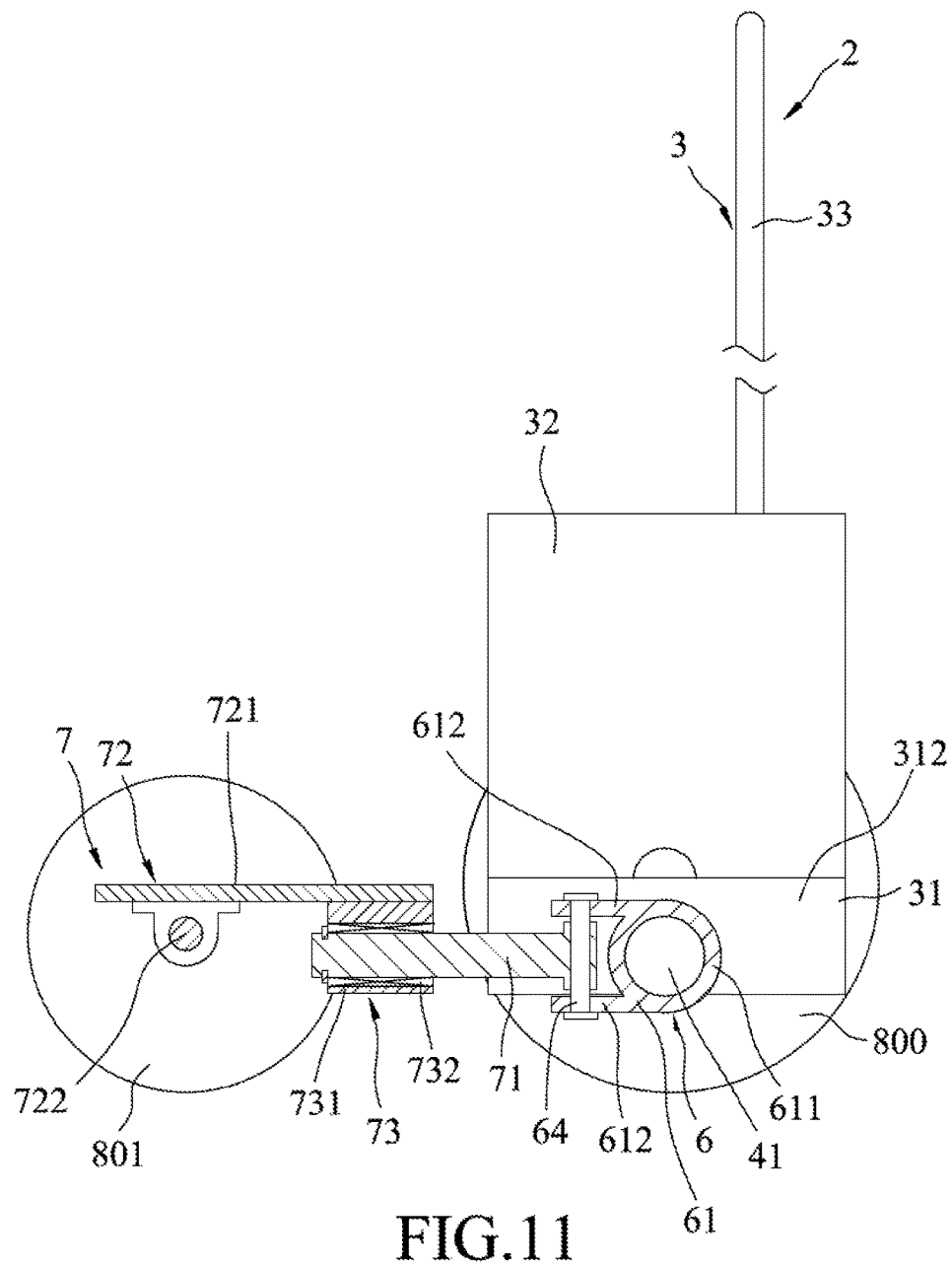
FIG. 11 is a sectional view of a third embodiment of the self-balancing vehicle frame according to the disclosure.
Figure 12:
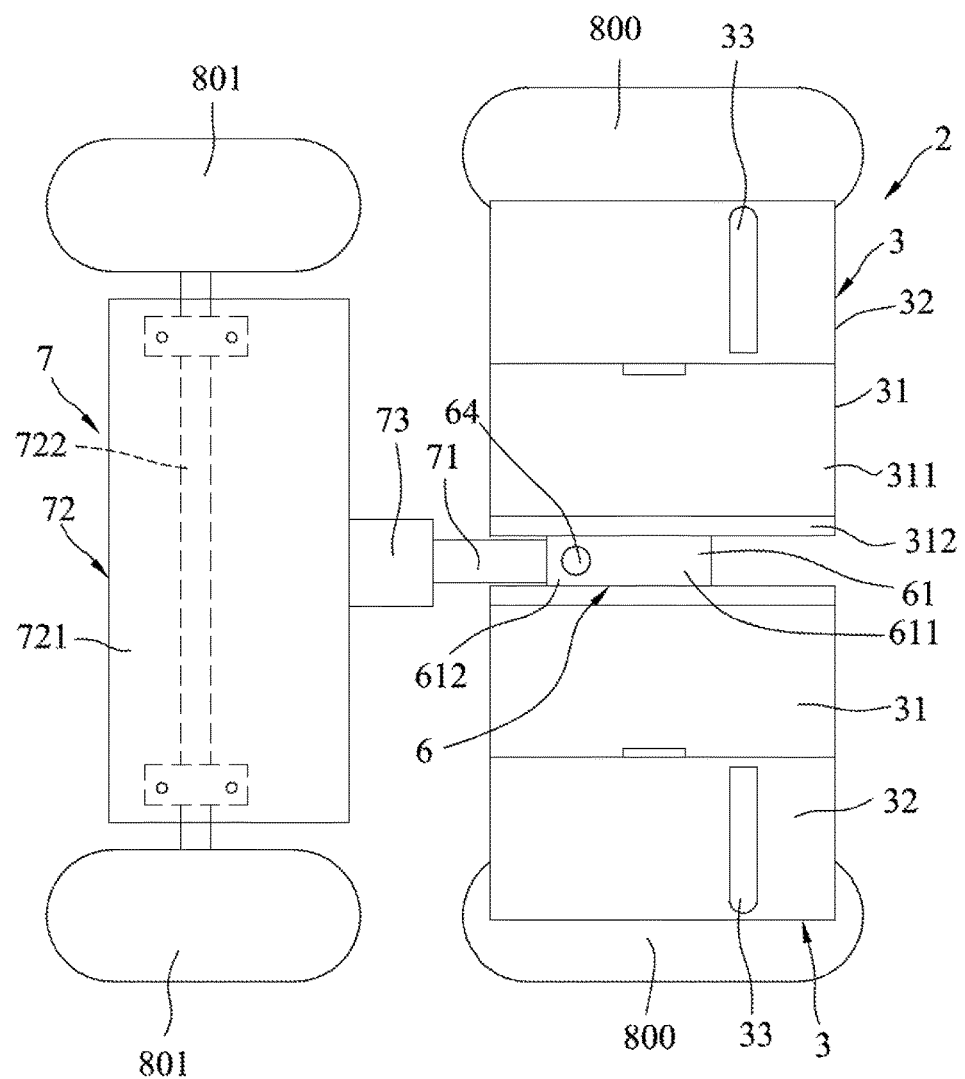
FIG. 12 is a top view of the third embodiment.

Referring to FIGS. 11 and 12, a third embodiment of the self-balancing vehicle frame according to this disclosure includes a front frame assembly 2 that includes two front frame units 3, and a first connecting unit 4 connected between the front frame units 3, and a rear frame assembly 7 that is connected to the front frame assembly 2.

The front frame assembly 2 further includes a joint assembly 6 that includes a joint member 61 and a pin member 64. The joint member 61 is rotatable relative to the first connecting seat 41 about the first axis 430, and has a ring portion 611 that is sleeved rotatably around the first connecting seat 41, and two lug portions 612 that extend rearwardly from the ring portion 611 and that are spaced apart from each other in an up-down direction. The pin member 64 extends into both of the lug portions 612 of the joint member 61.

The rear frame assembly 7 includes a connecting rod 71, a rear frame unit 72 and a second connecting unit 73. The connecting rod 71 has a front portion disposed between the lug portions 612 of the joint member 61 and permitting the pin member 64 to extend therethrough, such that the connecting rod 71 is pivotable relative to the joint assembly 6 about the pin member 64.

The rear frame unit 72 includes a rear frame 721, and a rear wheel axle 722 that is provided on a bottom surface of the rear frame 721, that extends in a lateral direction of the rear frame assembly 7, and that has two longitudinally opposite end portions mounted respectively with two rear wheels 801.

The second connecting unit 73 includes a bearing seat 731 that is connected fixedly to the bottom surface of the rear frame 721, and a rod mounting bearing 732 that is mounted between the bearing seat 731 and a rear end portion of the connecting rod 71. By virtue of the second connecting unit 73 and the connecting rod 71, the rear frame unit 72 is rotatable about the connecting rod 71, and is pivotable about the pin member 64.

The third embodiment is for use of a four-wheeled self-balancing vehicle. The movement of such a four-wheeled self-balancing vehicle is easy to control through operation of the front frame units 3 of the third embodiment. Moreover, the rear frame unit 72 may be provided with a vehicle seat (not shown) for a user to sit thereon. As such, an elder, a patient or a disable person could sit on the vehicle seat to steer the four-wheeled self-balancing vehicle. In actual practice, the rear frame unit 72 may be provided with a basket (not shown) or other accessories.

The rear frame assembly 7 is easy to be detached from the front frame assembly 2 by separating the pin member 64 from the joint member 61.

Figure 13:
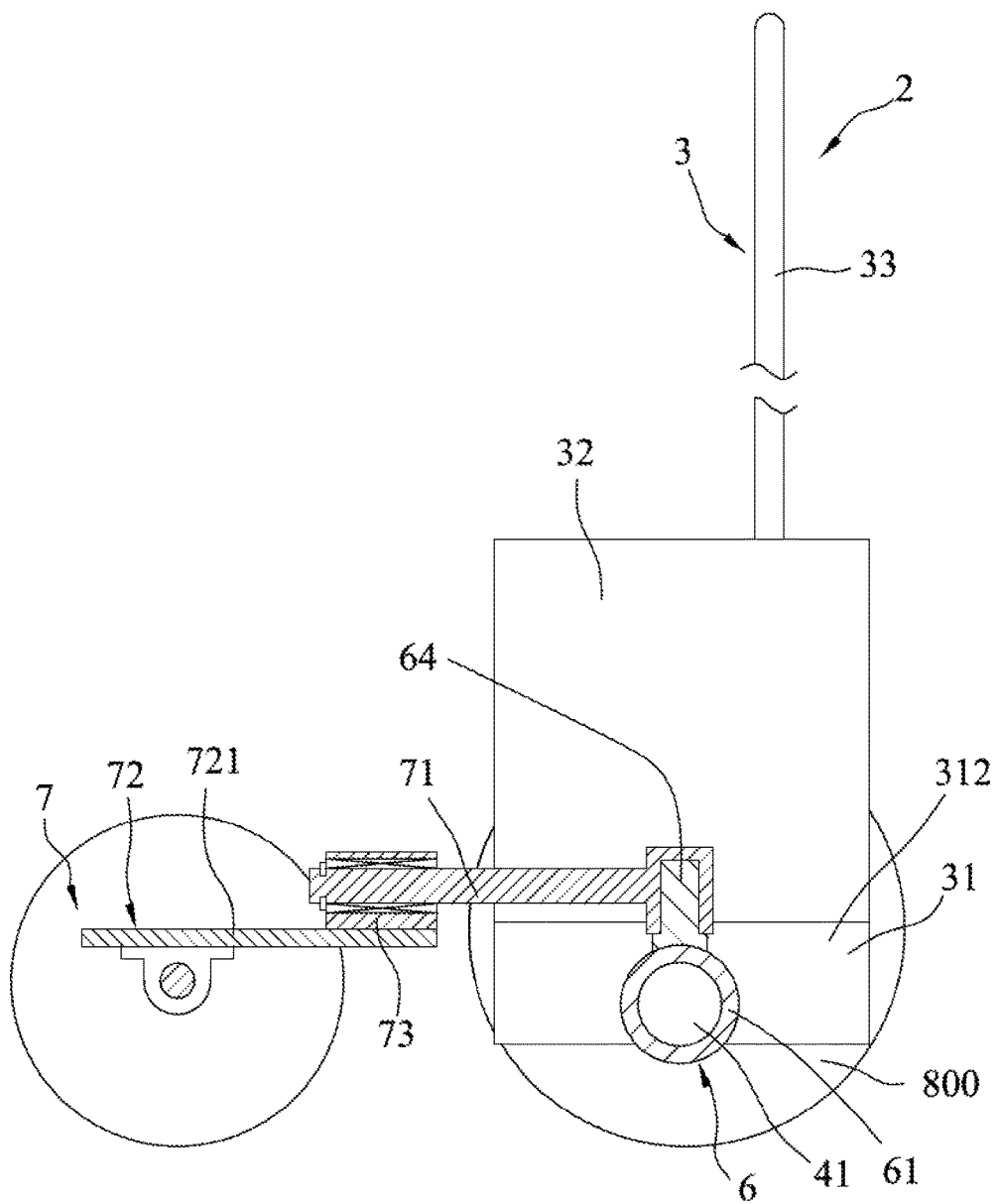
FIG. 13 is a variation of the third embodiment.

Referring further to FIG. 13, the joint assembly 6 of a variation of the third embodiment includes a ring-shaped joint member 61 that is sleeved rotatably around the first connecting unit 4, and an upright pin member 64 that is fixed to an outer surface of the joint member 61. The connecting rod 71 of the rear frame assembly 7 has a front end portion sleeved around the pin member 64 and rotatable about the pin member 64, such that the rear frame assembly 7 is rotatable about the pin member 64.

In actual practice, the second connecting unit 73 may be omitted, and the rear end portion of the connecting rod 71 may be directly fixed to the rear frame 721 of the rear frame unit 72.

Figure 14:
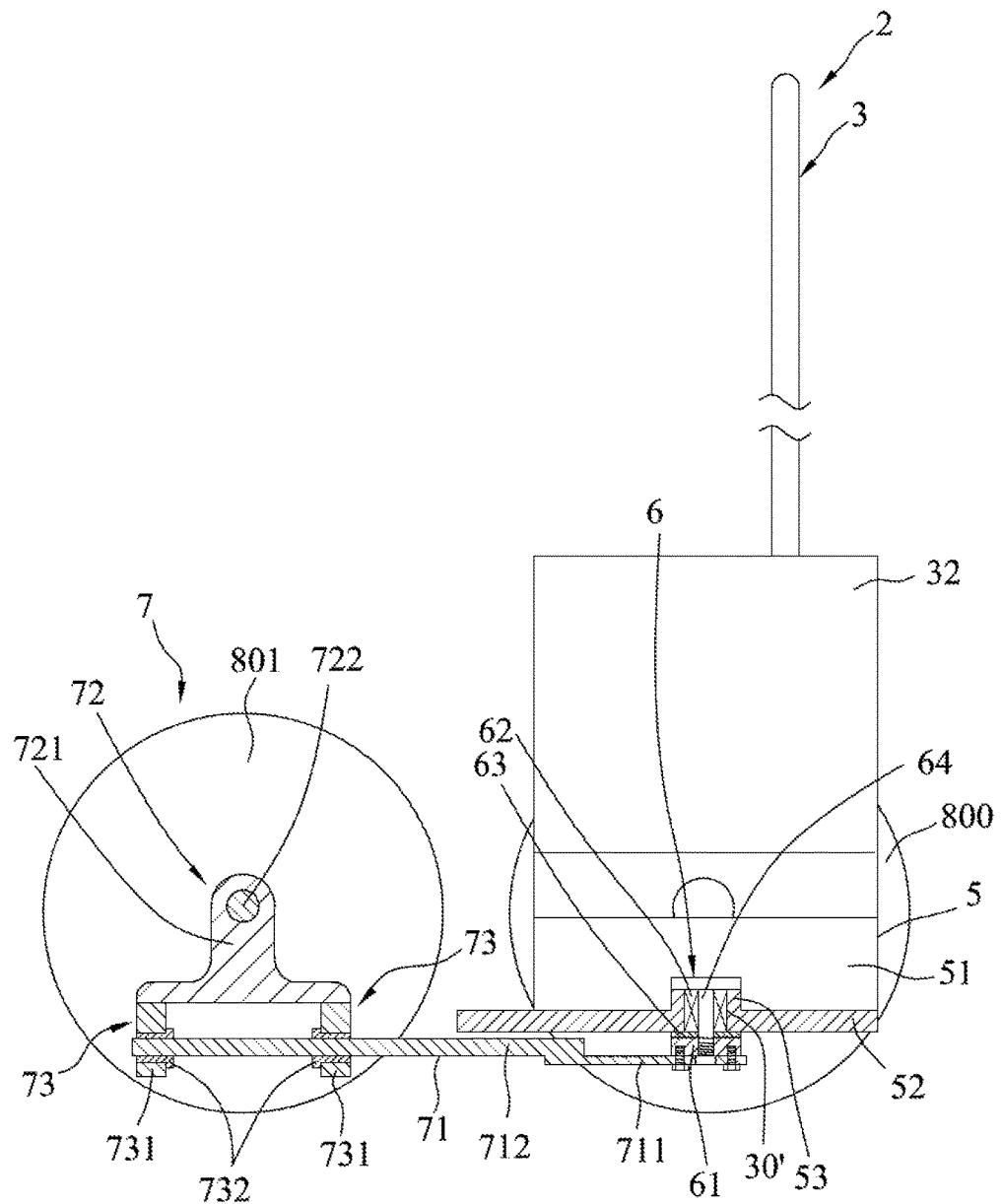
FIG. 14 is a sectional view of a fourth embodiment of the self-balancing vehicle frame according to the disclosure.
Figure 15:
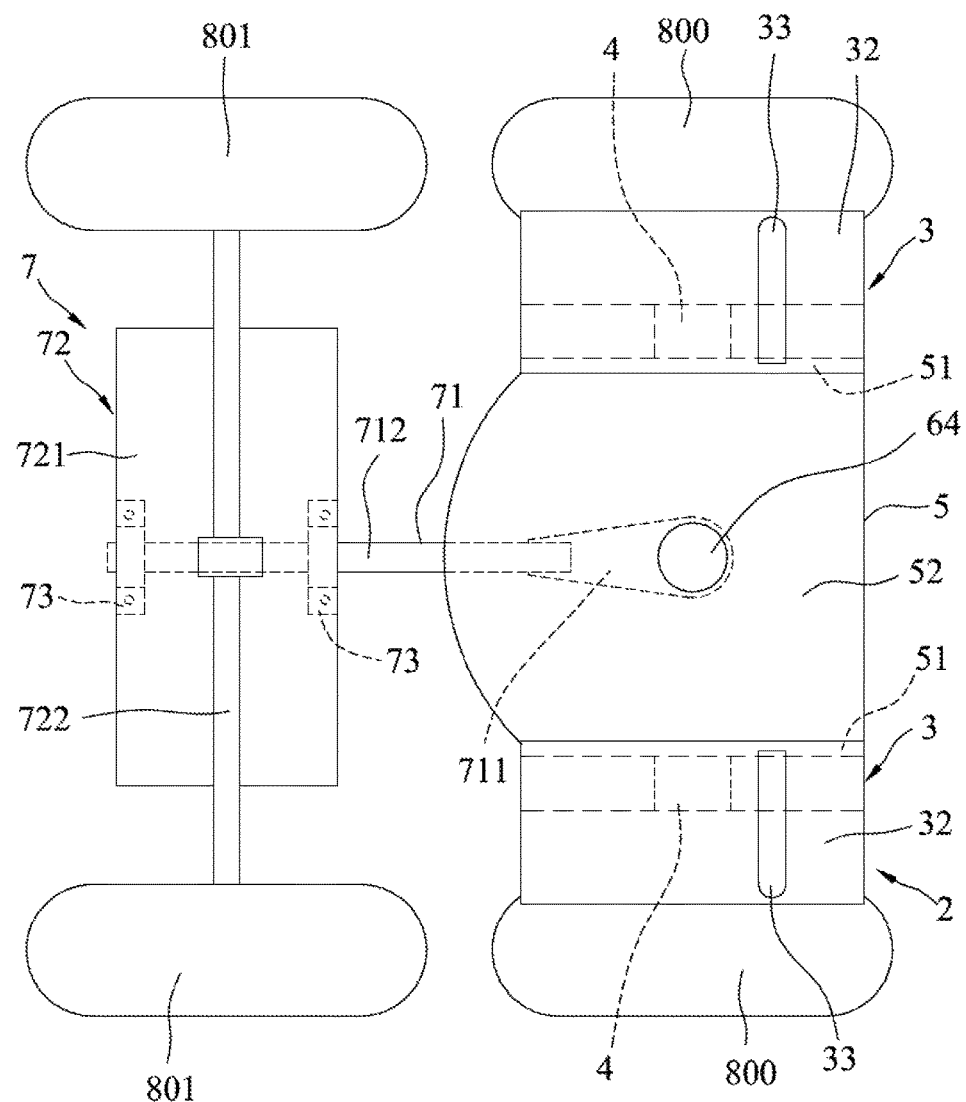
FIG. 15 is a top view of the fourth embodiment.
Figure 16:
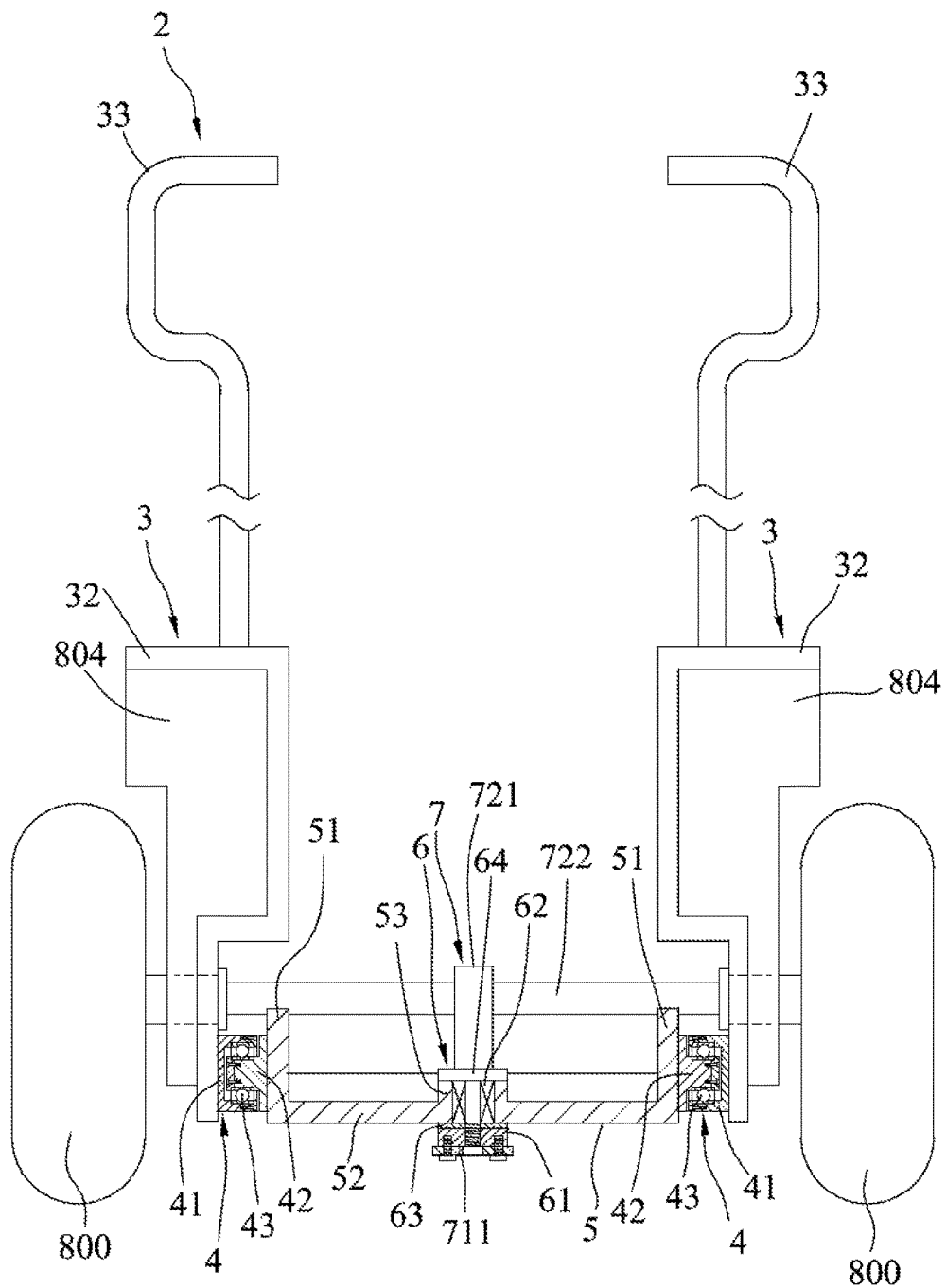
FIG. 16 is a schematic sectional view of the fourth embodiment.

Referring to FIGS. 14 to 16, a fourth embodiment of the self-balancing vehicle frame according to this disclosure includes a front frame assembly 2 that includes two front frame units 3, two first connecting units 4, a joint assembly 6 and an intermediate frame 5, and a rear frame assembly 7 that is connected to the front frame assembly 2.

Each of the front frame units 3 includes a frame body 32, and a handle 33 that is disposed on a top end of the frame body 32. The frame body 32 of each of the front frame units 3 is mounted with the respective one of the wheels 800 and the corresponding one of the angle sensors 804.

The intermediate frame 5 is disposed between the front frame units 3, and has a main body 52, two connecting walls 51 extending respectively and upwardly from two opposite lateral edges of the main body 52, and an upright tubular portion 53 provided at a central portion of the main body 52. The tubular portion 53 defines an uprightly-extending through hole 30' therein.

Each of the first connecting units 4 is connected between a respective one of the front frame units 3 and a respective one of the connecting walls 51 that is proximate to the respective one of the front frame units 3, and includes a first connecting seat 41 that is connected fixedly to an inner side surface of the frame body 32 of the respective one of the front frame units 3 facing respective one of the connecting walls 51, a second connecting seat 42 that is connected fixedly to an inner side surface of the respective one of the connecting walls 51 facing the frame body 32 of the respective one of the front frame units 3, and a seat connecting bearing 43 that is mounted between the first and second connecting seats 41, 42 such that the respective one of the front frame units 3 is rotatable relative to the intermediate frame 5 about a first axis 430.

The joint assembly 6 includes a pin mounting bearing 62 that is mounted in the through hole 30' of the intermediate frame 5, a pin member 64 that is mounted in the pin mounting bearing 62 and that is rotatable relative to the intermediate frame 5, a joint member 61 that is connected co-rotatably to the pin member 62 and that is disposed under the main body 52 of the intermediate frame 5, and a thrust bearing 63 that is mounted around the pin member 64 and that is disposed between the joint member 61 and the main body 52 of the intermediate frame 5.

The rear frame assembly 7 includes a connecting rod 71, a rear frame unit 72 and a second connecting unit 73. The connecting rod 71 has a front plate portion 711 connected co-rotatably and detachably to a bottom end (i.e., bottom surface) of the joint member 61 by screws such that the connecting rod 71 is pivotable relative to the intermediate frame 5 about the pin member 64, and a rod portion 712 extending rearwardly from the front plate portion 711.

The rear frame unit 72 includes a rear frame 721, and a rear wheel axle 722 that is provided on a top surface of the rear frame 721, that extends in a lateral direction of the rear frame assembly 7, and that has two longitudinally opposite end portions mounted respectively with two rear wheels 801.

The second connecting unit 73 includes two bearing seats 731 that are connected fixedly to a bottom surface of the rear frame 721 and that are spaced apart from each other in a front-rear direction, and two rod mounting bearings 732 that are respectively mounted in the bearing seat 731 for extension of the rod portion 712 of the connecting rod 71 therethrough. By virtue of the second connecting unit 73 and the connecting rod 71, the rear frame unit 72 is rotatable about the connecting rod 71, and is rotatable about the pin member 64 relative to the intermediate frame 5.

A user can stand on the main body 52 of the intermediate frame 5, and control the movement of a four-wheeled self-balancing vehicle using the fourth embodiment of this disclosure through operation of the handles 33 of the front frame units 3. Moreover, the rear frame unit 72 may be provided with a basket (not shown) or other accessories.

Figure 17:
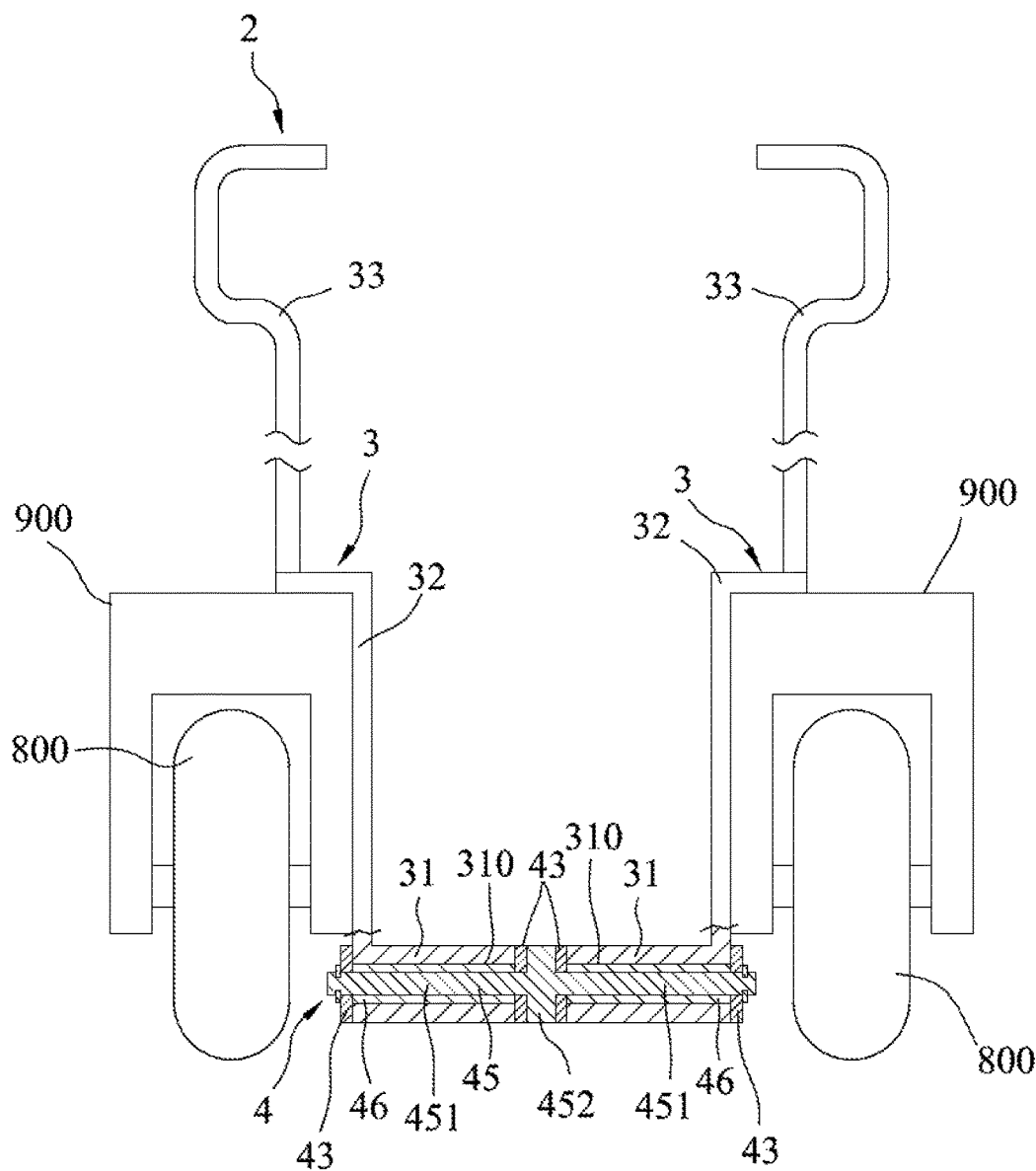
FIG. 17 is a schematic sectional view of a fifth embodiment of the self-balancing vehicle frame according to the disclosure.

Referring to FIG. 17, a fifth embodiment of the self-balancing vehicle frame according to this disclosure includes a front frame assembly 2 that includes two front frame units 3 and a first connecting unit 4 connected between the front frame units 3.

Each of the front frame units 3 is mounted with a single-wheeled self-balancing vehicle 900 that includes a wheel 800 and an angle sensor (not shown).

Each of the front frame units 3 includes a frame body 32, a pedal 31 that is connected to a lower end portion of the frame body 32, and a handle 33 that is disposed on a top end of the frame body 32. The pedal 31 of each of the front frame units 3 is formed with a laterally-extending mounting through hole 310.

The first connecting unit 4 includes two axle mounting bearings 46 that are respectively mounted in the mounting through holes 310 of the front frame units 3, an axle member 45 that extends through the axle mounting bearings 46, and two pairs of seat connecting bearings 43 that are mounted on the axle member 45.

The axle member 45 has two rod portions 451 that are respectively inserted into the axle mounting bearings 46 of the first connecting unit 4, and a flange portion 452 that is connected between the rod portions 451. Each pair of the seat connecting bearings 43 are located respectively at two opposite sides of a respective one of the axle mounting bearings 46, such that one of the pair of the seat connecting bears 43 is disposed at and end of a corresponding rod portion 451 distal from the flange portion 452, and the other of the pair of the seat connecting bears 43 is disposed between the flange portion 452 and the respective one of the axle mounting bearings 46. In this embodiment, each of the seat connecting bearings 43 is configured as a plain thrust bearing, but is not limited to such.

A user can step on the pedals 31 using the feet and hold the handles 33 using the hands for controlling the movement of the single-wheeled self-balancing vehicles 900.

Figure 18:
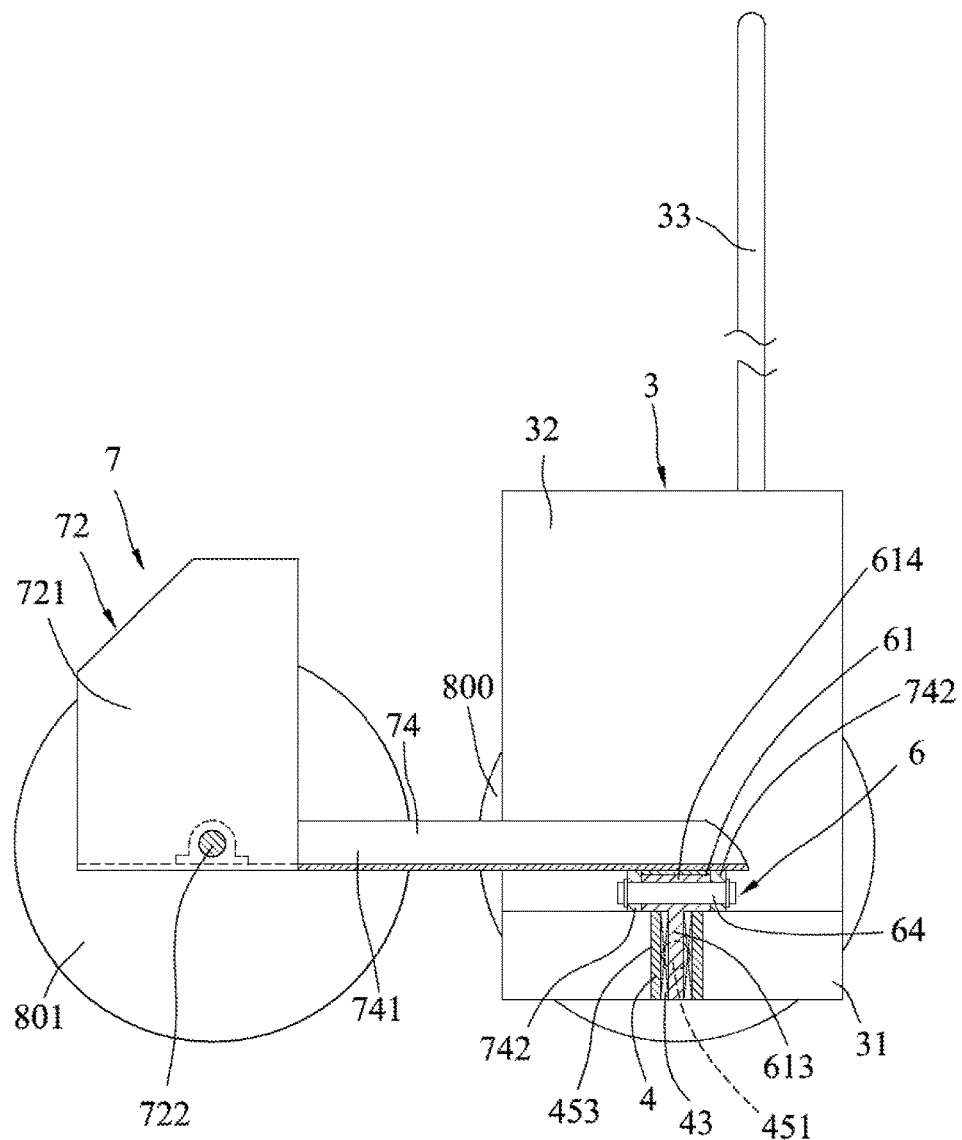
FIG. 18 is a schematic sectional view of a sixth embodiment of the self-balancing vehicle frame according to the disclosure.
Figure 19:
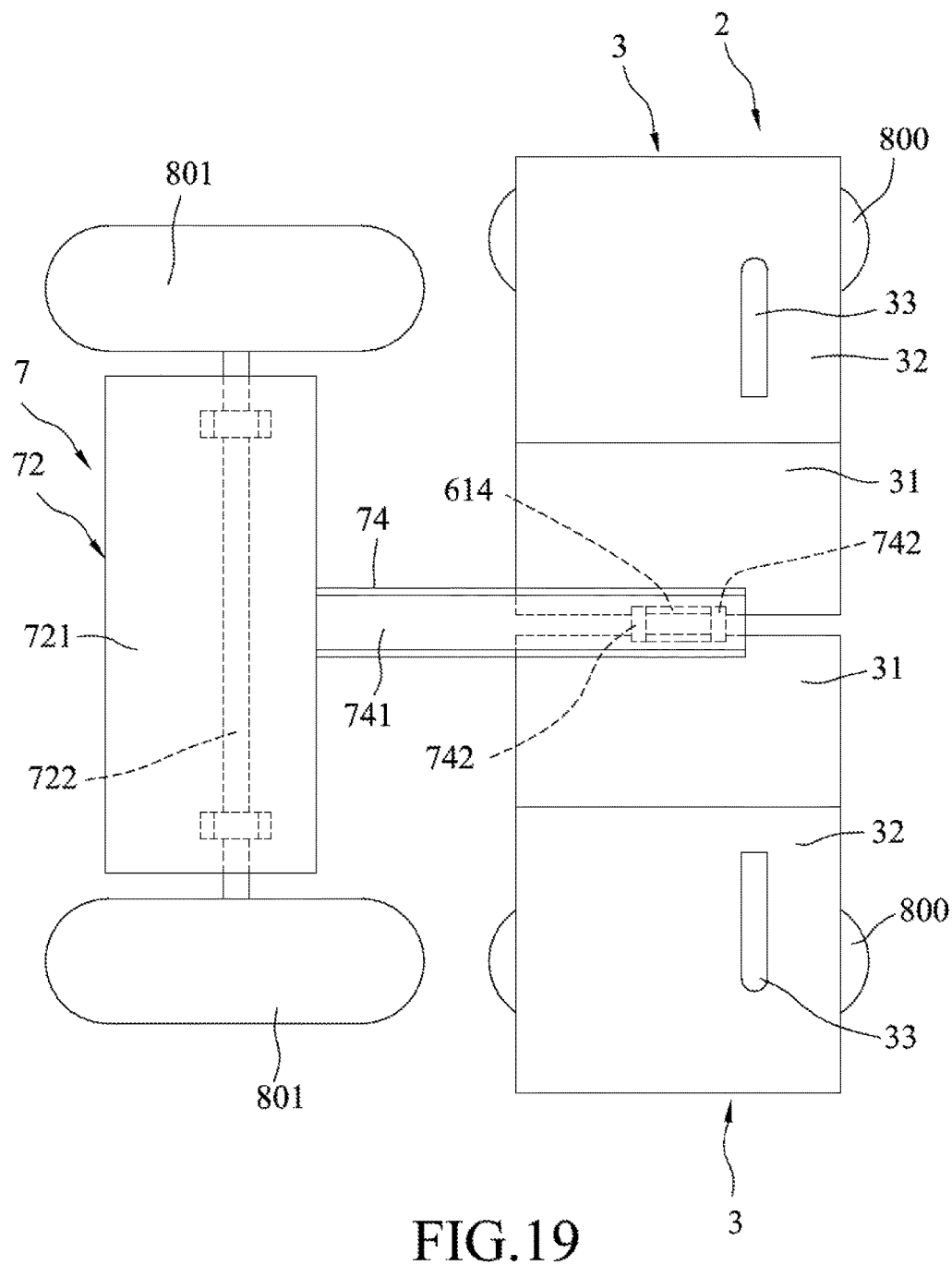
FIG. 19 is a top view of the sixth embodiment.
Figure 20:
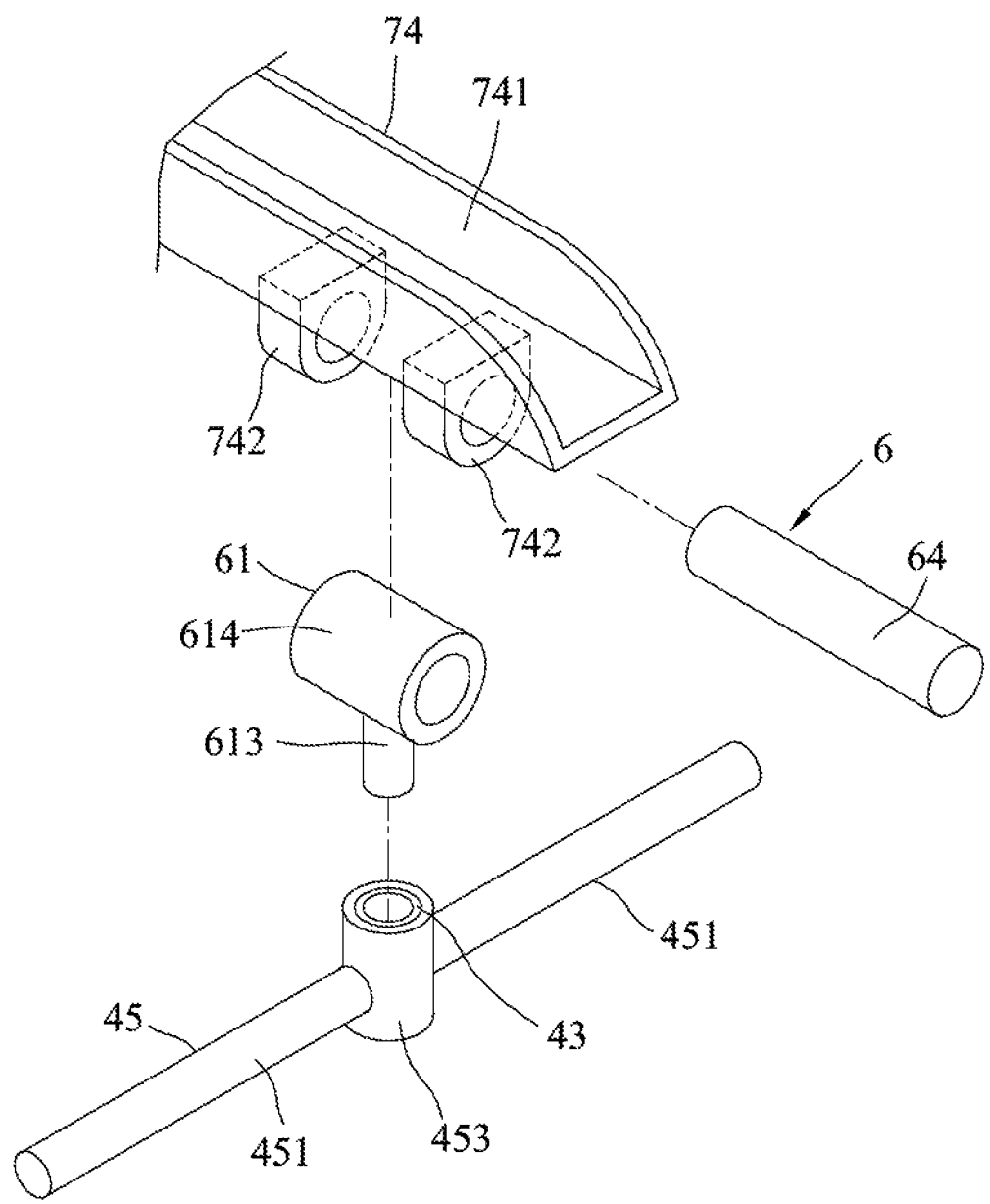
FIG. 20 is fragmentary exploded perspective view of a first connecting unit, a joint assembly and a rear frame assembly of the sixth embodiment.

Referring to FIGS. 18 to 20, a sixth embodiment of the self-balancing vehicle frame according to this disclosure includes a front frame assembly 2 that includes two front frame units 3, a first connecting units 4, a joint assembly 6 and an intermediate frame 5, and a rear frame assembly 7 that is connected to the front frame assembly 2.

The first connecting unit 4 includes an axle member 45 that has two rod portions 451 respectively inserted into two axle mounting bearings (not shown) respectively mounted in the pedals 31 of the front frame units 3, and a tubular seat portion 453 connected between the rod portions 451 and extending in an upright direction, and a seat connecting bearing 43 that is mounted in the seat portion 453.

The joint assembly 6 includes a joint member 61 and a pin member 64. The joint member 61 has a tubular portion 614 that extends in a front-rear direction, and a rod portion 613 that extends downwardly from an outer surface of the tubular portion 614 and that is inserted into the seat connecting bearing 43.

The rear frame assembly 7 includes a connecting rod 74 and a rear frame unit 72. The connecting rod 74 has a rod portion 741 of an U-shaped cross-section that extends in the front-rear direction, and a pair of lug portions 742 that are provided at a bottom surface of the rod portion 741 and that are spaced apart from each other in the front-rear direction. The pin member 64 extends rotatably through the lug portions 742 and the tubular portion 614 of the joint member 61 such that the connecting rod 74 is rotatable relative to the joint member 61 about the pin member 64. The rear frame unit 72 is connected fixedly to the rear end portion of the connecting rod 74.

In actual practice, the rear frame unit 72 may be provided with a vehicle seat (not shown), a basket (not shown) or other accessories.

In a variation of this embodiment, the seat portion 453 of the axle member 45 may be configured as a rod, and the seat connecting bearing 43 is sleeved around the seat portion 453. The joint member 61 may have a tubular portion that is sleeved on the seat connecting bearing 43 such that the joint member 61 is rotatable relative to the axle member 45 about the seat portion 453. In another variation of the embodiment, the seat portion 453 may have a blind hole that is formed in a top surface thereof for being mounted with the seat connecting bearing 43.

In view of the above, due to design of the front frame units 3 and the first connecting unit 4 of some of the embodiments or design of the front frame units 3, the first connecting unit 4, and the intermediate frame 5 of another embodiment of this disclosure, the front frame assembly 2 can be mounted with the wheels 800 and the angle sensors 804 to form a two-wheeled self-balancing vehicle. Or, the vehicle frame 2 can be used to interconnect two single-wheeled balancing vehicles to form a two-wheeled self-balancing vehicle or a four-wheeled self-balancing vehicle. In this manner, the vehicle can be controlled to travel and turn by operating the handle portions 33 with the hands and/or operating the pedal portions 31 with the feet, thereby promoting the flexibility of controlling the vehicle.

Via the presence of the rear frame assembly 7 in some of the embodiments of this disclosure, the self-balancing vehicle frame can be used in a four-wheeled self-balancing vehicle, which is more stable than the two-wheeled self-balancing vehicle. Moreover, the rear frame unit 72 may be provided with a vehicle seat (not shown), a basket (not shown) or other accessories for various demands of users. That is, the vehicle is convenient to operate. Thus, the object of this invention is achieved.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A self-balancing vehicle frame adapted to be mounted with a rear frame assembly, and adapted to be mounted with two angle sensors and two wheels that are electrically and respectively coupled to the angle sensors, each of the wheels being controlled to rotate for maintaining a corresponding one of the angle sensors in a balanced state in response to tilt of the corresponding one of the angle sensors, said self-balancing vehicle frame comprising a front frame assembly that includes:

two front frame units, before assembled into a complete self-balancing vehicle and having a subassembly underneath the two front frame units, cooperatively defining a connecting space therebetween, each of said front frame units being adapted to be mounted with a respective one of the wheels and a respective one of the angle sensors, and being operable to tilt the corresponding one of the angle sensors; and a first connecting unit located in said connecting space, and interconnecting said front frame units such that said front frame units are rotatable relative to each other about a rotating axis of said first connecting unit, after said first connecting unit being assembled into a complete self-balancing vehicle and in a working status, the rotating axis of said first connecting unit being set below the rotating axes of the wheels with an eccentricity, and said first connecting unit being accessible to the outer surroundings of said front frame units via said connecting space so as to be mounted with the rear frame assembly.

2. The self-balancing vehicle frame as claimed in claim 1, wherein each of said front frame units includes an inner side surface facing the other of said front frame units, and a pedal for being stepped on and operated to tilt the corresponding one of the angle sensors, said first connecting unit being connected between said inner side surfaces of said front frame units.

3. The self-balancing vehicle frame as claimed in claim 2, wherein said pedal of each of said front frame units is configured as a hollow box in which the corresponding one of the angle sensors is mounted.

4. The self-balancing vehicle frame as claimed in claim 2, wherein each of said front frame units further includes a handle connected to said pedal and operable to tilt the corresponding one of the angle sensors.

5. The self-balancing vehicle frame as claimed in claim 2, wherein said pedal of each of said front frame units is formed with a laterally-extending mounting through hole, said first connecting unit including two axle mounting bearings that are respectively mounted in said mounting through holes of said front frame units, an axle member that extends through said axle mounting bearings, and two pairs of seat connecting bearings that are mounted on said axle member, said axle member having two rod portions that are respectively inserted into said axle mounting bearings of said first connecting unit, and a flange portion that is connected between said rod portions, each pair of said seat connecting bearings being located respectively at two opposite sides of a respective one of said axle mounting bearings, such that one of said pair of said seat connecting bearings is disposed at an end of a corresponding one of said rod portions distal from said flange portion, and the other of said pair of said seat connecting bearings is disposed between said flange portion and the respective one of said axle mounting bearings, said flange portion of said axle member having an outer surface that is accessible to the outer surroundings of said front frame units via said connecting space.

6. A self-balancing vehicle frame adapted to be mounted with two angle sensors and two wheels that are electrically and respectively coupled to the angle sensors, each of the wheels being controlled to rotate for maintaining a corresponding one of the angle sensors in a balanced state in response to tilt of the corresponding one of the angle sensors, said self-balancing vehicle frame comprising a front frame assembly that includes:

two front frame units cooperatively defining a connecting space therebetween, each of said front frame units being adapted to be mounted with a respective one of the wheels and a respective one of the angle sensors, and being operable to tilt the corresponding one of the angle sensors; and a first connecting unit located in said connecting space, and interconnecting said front frame units such that said front frame units are rotatable relative to each other;

wherein each of said front frame units includes an inner side surface facing the other of said front frame units, and a pedal for being stepped on and operated to tilt the corresponding one of the angle sensors, said first connecting unit being connected between said inner side surfaces of said front frame units; and wherein said first connecting unit includes a first connecting seat that is connected fixedly to said inner side surface of said pedal of one of said front frame units, a second connecting seat that is connected fixedly to said inner side surface of said pedal of the other one of said front frame units, and a seat connecting bearing that is mounted between said first and second connecting seats such that said pedals of said front frame units are rotatable relative to each other, one of said first connecting seat and said second connecting seat having an outer surface that is accessible to the outer surroundings of said front frame units via said connecting space.

7. The self-balancing vehicle frame as claimed in claim 6, wherein each of said front frame units further includes a frame body, said pedal of each of said front frame units having a pedal wall that extends from a lower end portion of said corresponding frame body toward the other one of said front frame units, and a blocking wall that extends upwardly from an end of said pedal wall distal from a corresponding one of said frame bodies, said blocking walls of said front frame units cooperatively defining said connecting space therebetween, said first and second connecting seats being connected fixedly and respectively to said side surfaces of said blocking walls of said front frame units facing each other.

8. A self-balancing vehicle frame adapted to be mounted with two angle sensors and two wheels that are electrically and respectively coupled to the angle sensors, each of the wheels being controlled to rotate for maintaining a corresponding one of the angle sensors in a balanced state in response to tilt of the corresponding one of the angle sensors, said self-balancing vehicle frame comprising a front frame assembly that includes:

two front frame units cooperatively defining a connecting space therebetween, each of said front frame units being adapted to be mounted with a respective one of the wheels and a respective one of the angle sensors, and being operable to tilt the corresponding one of the angle sensors; and a first connecting unit located in said connecting space, and interconnecting said front frame units such that said front frame units are rotatable relative to each other;

wherein each of said front frame units includes an inner side surface facing the other of said front frame units, and a pedal for being stepped on and operated to tilt the corresponding one of the angle sensors, said first connecting unit being connected between said inner side surfaces of said front frame units; and wherein said front frame assembly further includes a joint assembly that is mounted rotatably around said first connecting unit, said self-balancing vehicle frame further comprising a rear frame assembly that is connected pivotally to said joint assembly and that is adapted to be mounted with two additional wheels.

9. The self-balancing vehicle frame as claimed in claim 8, wherein said rear frame assembly includes a connecting rod that is connected rotatably to said joint assembly and that extends rearwardly from said joint assembly, a rear frame unit that is located behind said front frame assembly, and a second connecting unit that is connected fixedly to said rear frame unit and that is connected rotatably to a rear end portion of said connecting rod.

10. The self-balancing vehicle frame as claimed in claim 9, wherein said joint assembly includes a joint member and a pin member, said joint member having a ring portion that is sleeved rotatably around said first connecting unit, and two lug portions that extend rearwardly from said ring portion and that are spaced apart from each other in an up-down direction, said connecting rod of said rear frame assembly having a front end portion that is disposed between said lug portions of said joint member, said pin member extending rotatably into said lug portions of said joint member and said front end portion of said connecting rod.

11. The self-balancing vehicle frame as claimed in claim 9, wherein said joint assembly includes a ring-shaped joint member that is sleeved rotatably around said first connecting unit, and an upright pin member that is fixed to an outer surface of said joint member, said connecting rod of said rear frame assembly having a front end portion sleeved around said pin member and rotatable about said pin member.

12. The self-balancing vehicle frame as claimed in claim 9, wherein said second connecting unit includes a bearing seat that is connected fixedly to said rear frame unit, and a rod mounting bearing that is mounted between said bearing seat and said connecting rod.

13. The self-balancing vehicle frame as claimed in claim 9, wherein said rear frame unit includes a rear frame, and a rear wheel axle that is provided on said rear frame, that extends in a lateral direction, and that has two longitudinally opposite end portions mounted respectively with the additional wheels.

14. The self-balancing vehicle frame as claimed in claim 8, wherein said first connecting unit includes two axle mounting bearings that are mounted respectively in said pedals of said front frame units, an axle member that has two rod portions respectively inserted into said axle mounting bearings, and a tubular seat portion connected between said rod portions and extending in an upright direction, and a seat connecting bearing that is mounted in said seat portion, said joint assembly being inserted into said seat connecting bearing and being rotatable relative to said axle member about an upright axis, said rear frame assembly including a rear frame unit that is located behind said front frame assembly and that is adapted to be mounted with the additional wheels, and a connecting rod that is connected rotatably to said joint assembly and that extends rearwardly from said joint assembly to be connected fixedly to said rear frame unit.

15. The self-balancing vehicle frame as claimed in claim 14, wherein said joint assembly includes a joint member and a pin member, said joint member having a tubular portion that extends in a front-rear direction, and a rod portion that extends downwardly from an outer surface of said tubular portion and that is inserted into said seat connecting bearing, said connecting rod having a rod portion that extends in the front-rear direction and that is connected fixedly to said rear frame unit, and at least one lug portion that is provided on said rod portion of said connecting rod, said pin member extending rotatably through said lug portions and said tubular portion of said joint member.

* * * * *